United States Patent [19]

Iljunin et al.

[11] 3,912,583

[45] Oct. 14, 1975

[54] FAST-NEUTRON REACTOR

[76] Inventors: Vladimir Grigorievich Iljunin, ulitsa Migunova, 9, kv. 28, Obninsk, Kaluzhskoi oblasti; Viktor Mikhailovich Murogov, ulitsa Lenina, 13/1, kv. 4, Obninsk Kaluzhskoi oblasti; Anatoly Nikolaevich Shmelev, ulitsa Novorogozhskaya, 4, kv. 7, U.S.S.R.

[22] Filed: Aug. 30, 1973

[21] Appl. No.: 393,127

[52] U.S. Cl. ............ 176/40; 176/18; 176/61; 176/78
[51] Int. Cl. .............. G21c 1/02; G21c 15/04
[58] Field of Search ............ 176/40, 17, 18, 61, 64, 176/78, 50

[56] References Cited
UNITED STATES PATENTS

| | | | |
|---|---|---|---|
| 3,215,606 | 11/1965 | Silvester | 176/78 |
| 3,271,260 | 9/1966 | Noderer | 176/40 |
| 3,368,945 | 2/1968 | Keller et al. | 176/78 |
| 3,658,643 | 4/1972 | Spenke | 176/40 |
| 3,736,225 | 5/1973 | Barker et al. | 176/40 |

Primary Examiner—Harvey E. Behrend
Attorney, Agent, or Firm—Holman & Stern

[57] ABSTRACT

A fast-neutron reactor wherein the core and the surrounding lateral and axial blankets are made up of fuel element stacks. The walls of each stack have holes in the middle portion thereof with respect to the height of the core. Main and additional fuel elements are arranged respectively above and below the plane passing through the centers of the holes, inside each stack, the spacing between which fuel elements forms, together with the holes, the inlet header of the coolant washing the fuel elements. The inlet header splits the coolant into two oppositely directed flows lead away by two outlet headers arranged above and below the upper and lower axial blankets.

36 Claims, 20 Drawing Figures

3,912,583

FAST-NEUTRON REACTOR

BACKGROUND OF THE INVENTION

The present invention relates generally to nuclear reactors and more particularly it relates to fast-neutron reactors.

A fast-neutron reactor is known wherein the core and the surrounding lateral and upper and lower axial blankets are made up of fuel element stacks with the fuel elements therein being washed by a coolant fed through an inlet header and lead away through an outlet header disposed above the upper axial blanket.

In this reactor, the coolant is fed through an inlet header disposed below the lower axial blanket to the fuel elements of the lower axial blanket stack. Then, the coolant flows upwards washing the fuel elements of the stacks of the core, lateral blanket and upper axial blanket. Having absorbed the heat released by the fuel elements, the heated coolant is lead away through an outlet header disposed above the upper axial blanket.

In such an embodiment, the power capacity of the reactor cannot be increased without a substantial increase in its critical mass.

As is well known, the critical mass minimum of a cylindrical reactor of a preset volume is observed with a core diameter-to-height ratio of $D/H \approx 1$. In practice, the height of a reactor is reduced, while the diameter is increased to optimum values with the result that the energy content of the fuel becomes higher, but at the same time the critical mass is substantially increased, which is a serious disadvantage of such a design. This is most essential for reactors with a high rate of neutron leakage from the core. In high-power reactors, it becomes highly important to introduce such structural modifications as the limiting of the core diameter, which is motivated by the necessity to transport the reactor plug, hence to limit the unit power of the reactor core, as is the case with the BN-600 type reactor (W ≤ 1,500 MW (el.).

SUMMARY OF THE INVENTION

It is an object of the present invention, therefore, to provide a fast-neutron reactor with a heat removal system that will allow for increasing the power capacity of the reactor core without a substantial increase in the critical mass of the reactor, as well as to substantially increase the reactor unit power to as high as 5,000 MW.

This object is attained by that in a fast-neutron reactor, wherein the core and the surrounding lateral as well as upper and lower axial blankets are made up of fuel element stacks disposed in the blankets and washed by a coolant fed through an inlet header and lead away through an outlet header disposed above the upper axial blanket. The walls of each fuel element stack have holes, according to the invention, with main fuel elements being disposed above or below the plane passing through the centers of the holes and additional fuel elements being disposed opposite to the main elements below or above the plane, respectively, the spacing between the main and additional fuel elements forming, together with the holes, the inlet header of the cooler, which inlet header splits the latter into two oppositely directed flows one of which is lead away through an additional outlet header disposed below the lower axial blanket.

It is expedient that the main and additional fuel elements of the axial blankets be spaced at regular intervals.

It is also expedient that the main and additional fuel elements making up the core of the reactor be arranged so as to form, transversely, a stepped profile from stack to stack with the height of the fuel elements in this arrangement gradually diminishing towards the reactor axis, while the main and additional fuel elements making up the axial blankets be arranged so as to form, also transversely, a stepped profile with the same height of the fuel elements in all the stacks.

It is advisable that in the transverse stepped arrangement of the axial blanket fuel elements, the height of the latter should gradually diminish towards the reactor axis.

It is also advisable that the main and additional fuel elements making up the core of the reactor be arranged so as to form, transversely, a flat profile with the same height of the fuel elements in all the stacks, while the main and additional fuel elements making up the axial blankets be arranged so as to form, transversely, a stepped profile from stack to stack with the height of the fuel elements in this arrangement gradually diminishing towards the reactor axis.

It is preferable that the main fuel elements making up the core and the axial blankets be spaced at intervals greater or smaller than those at which the additional fuel elements are spaced in the same blankets and core.

In the proposed fast-neutron reactor, the removal of heat is such that the power capacity of the core has been increased 1.3 to 1.5 times without any substantial increase in the overall dimensions of the reactor.

BRIEF DESCRIPTION OF THE DRAWINGS

The invention will now be described in greater detail with reference to preferred embodiments thereof taken in conjunction with the accompanying drawings, in which.

DETAILED DESCRIPTION OF THE PREFERRED EMBODIMENTS

The proposed fast-neutron reactor may be of both the tank type and the loop type. The design of a tank-type reactor is considered hereinbelow.

Figure 1:
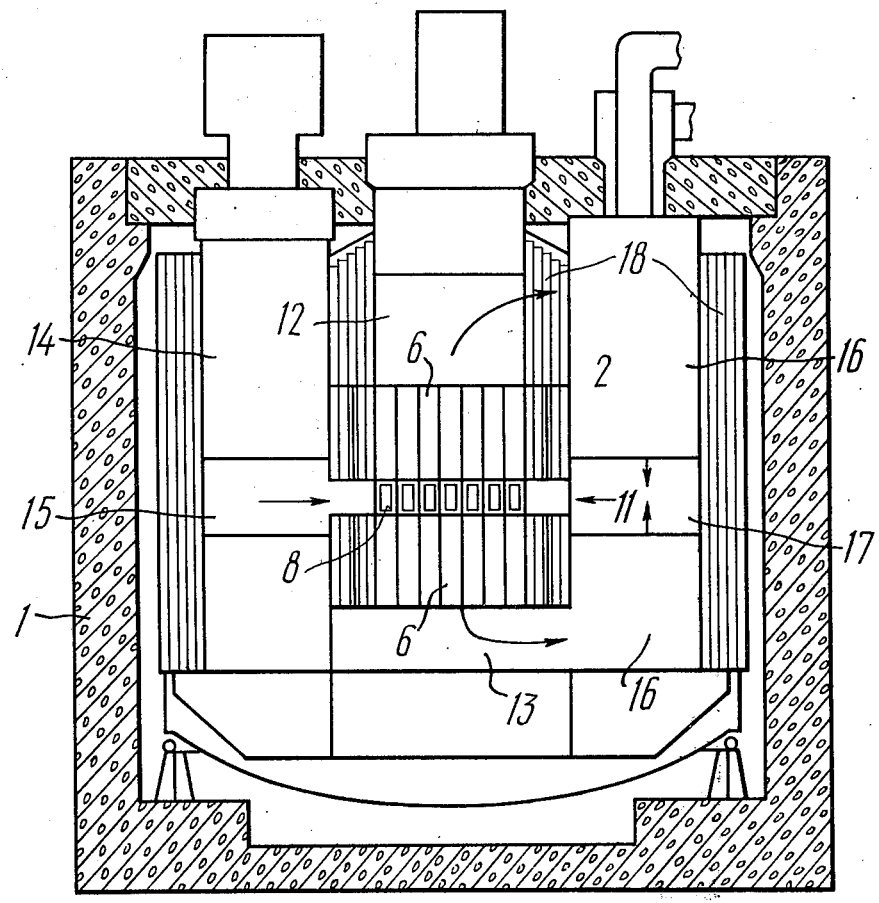
FIG. 1 is a schematic elevation view of a fast-neutron reactor, according to the invention.

Referring now to FIG. 1, the fast-neutron reactor of the present invention comprises a vessel 1 including a core 2 and the surrounding lateral, upper axial and lower axial blankets 3 (FIG. 2), 4 and 5, respectively. The core 2 and the blankets 3, 4 and 5 accommodate fuel element stacks 6 (FIG. 1) the walls thereof are perforated with holes 8 in the middle portion of thereof with respect to the height of the core 2. Arranged inside the stacks 6 above the plane 7 (FIG. 3) passing through the centers of the holes 8 are main fuel elements 9 spaced at small intervals, while arranged opposite to the main fuel elements 9 below the plane 7 are additional fuel elements 10, also spaced at small intervals.

Another embodiment of the reactor is possible, in which the main fuel elements are arranged below the plane, and the additional fuel elements are arranged thereabove.

In the latter case, a space is formed between the main and additional fuel elements 9 and 10, which, together with the holes 8, forms an input header 11 (FIG. 1) of the coolant, splitting the latter into two oppositely directed flows (indicated with arrows). This space is selected so as to ensure the required flow rate of the coolant, as well as the maximum possible neutron coupling between the main and additional fuel elements which are arranged in the core and filled with a fissionable substance.

One of the coolant flows (used as the coolant in the embodiment under consideration is liquid sodium) is directed upwards, washing the main fuel elements 9 (FIG. 3), and is lead away through an outlet header 12 (FIG. 1) disposed above the upper axial blanket 4. The other coolant flow is directed down-wards washing the additional fuel elements 10 (FIG. 3) and is lead away through an additional outlet header 13 (FIG. 1) disposed below the lower axial blanket 5.

Figure 2:
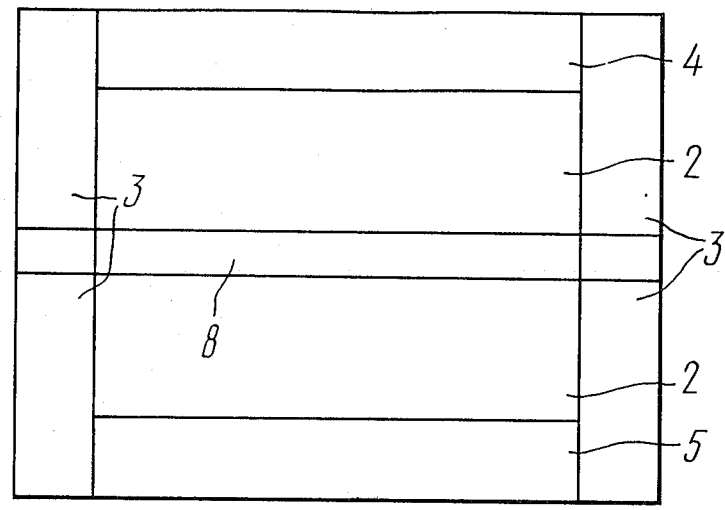
FIG. 2 shows the mutual arrangement of the core, lateral and axial blankets of the proposed reactor.

The circulation of the coolant and the removal of heat thereby from the main and additional fuel elements 9 (FIG. 3) and 10 are effected by means of a pump 14 (FIG. 1) communicating with an annular plenum chamber 15 surrounding the inlet header 11, as well as by means of a special intermediate heat exchanger 16 in which the heated coolant is cooled. The cooled coolant fills a transfer chamber 17 communicating with the plenum chamber of the pump 14. The reactor is also provided with a neutron shielding 18 surrounding the lateral blanket 3 (FIG. 2).

The pump, intermediate heat exchanger and neutron shielding, used in this embodiment of the proposed reactor, are known per se.

In order to ensure a uniform rate of washing of the main and additional fuel elements 9 (FIG. 3) and 10 by the coolant no matter how near or far they are from the axis of the reactor, i.e. to ensure a uniform and reliable heat removal over the entire height of the core 2, the fuel elements 9 and 10 should be preferably spaced at varying intervals. Therewith, the intervals between the fuel elements of the same stack may be equal or different.

In the following variants of the arrangement of the fuel elements from stack to stack, the intervals therebetween inside each stack are equal.

For rendering the attainment of the object of the present invention more effective, the fuel elements should advantageously be arranged so that the transverse profile formed by their ends has a varying shape. In other words, the height of the fuel elements disposed in the core and the axial blankets may be constant or radially variable.

Figure 4:
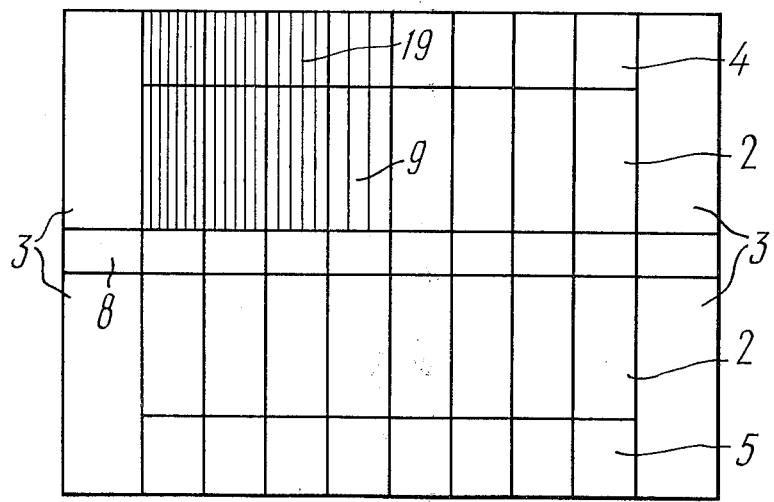
FIG. 4 shows schematically the arrangement of main fuel elements spaced at equal intervals in the core and the upper axial blanket, according to the invention.
Figure 5:
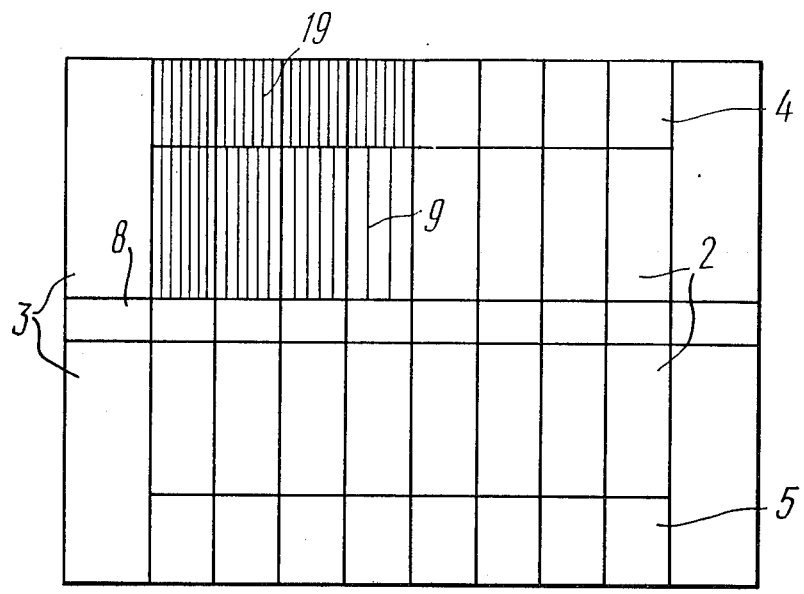
FIG. 5 shows schematically the arrangement of FIG. 4 with the main fuel elements being spaced at different intervals, according to the invention.

An embodiment is proposed wherein the main fuel elements 9 (FIG. 4) and 19 of the core 2 and the upper axial blanket 4, respectively, are spaced at intervals gradually increasing towards the vertical axis of the reactor. Therewith, the variation of the intervals between the fuel elements in the core 2 and the axial blanket 4 may be regular or, as is shown in FIG. 5, irregular.

Figure 6:
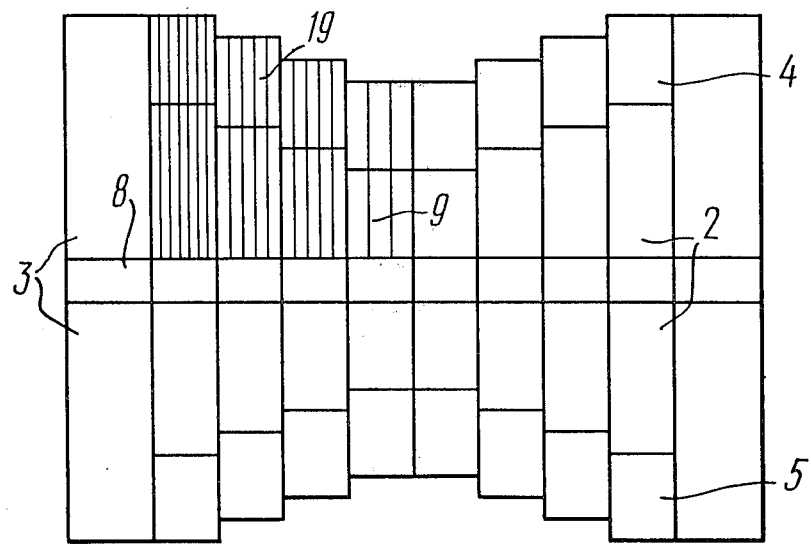
FIG. 6 shows schematically the arrangement of the main fuel elements spaced at equal intervals in the core and the upper axial blanket so as to form, transversely, a stepped profile, according to the invention.
Figure 7:
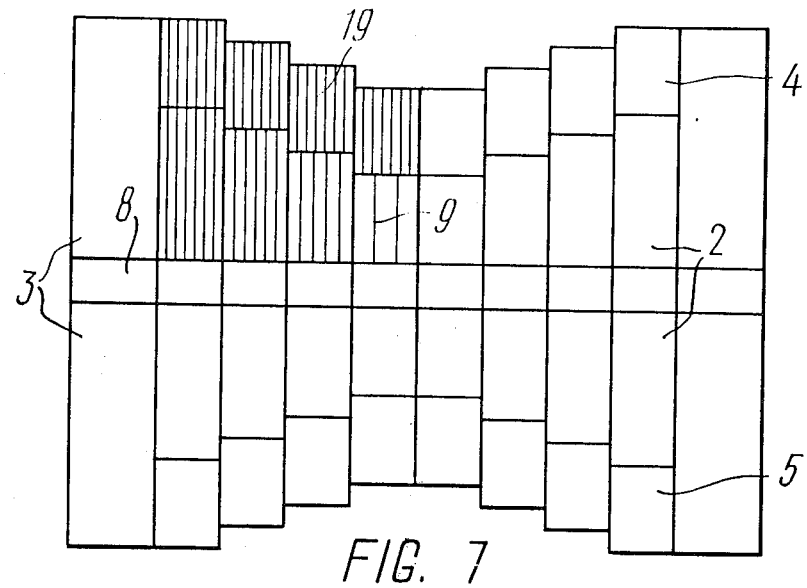
FIG. 7 shows schematically the arrangement of FIG. 6 with the main fuel elements being spaced at different intervals, according to the invention.

In another embodiment, the main fuel elements 9 (FIG. 6) of the core 2 are arranged so that their ends form, transversely, a stepped profile therewith the height of the fuel elements gradually diminishes towards the vertical axis of the reactor. The fuel elements 19 of the upper axial blanket 4 also form transversely, a stepped profile with their height being the same all over. In this case, the variation of the intervals between the fuel elements 9 and 19 in the core 2 and the upper axial blanket 4, respectively, may also be regular or, as is shown in FIG. 7, irregular.

Figure 8:
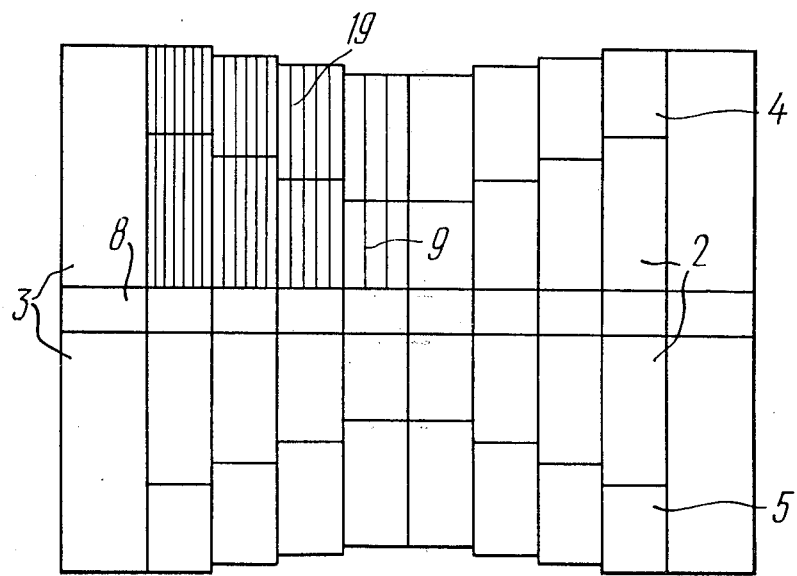
FIG. 8 shows schematically the arrangement of the main fuel elements spaced at equal intervals in the core and the upper axial blanket so that the height of the fuel elements in the axial blanket gradually increases towards the center of the reactor, according to the invention.
Figure 9:
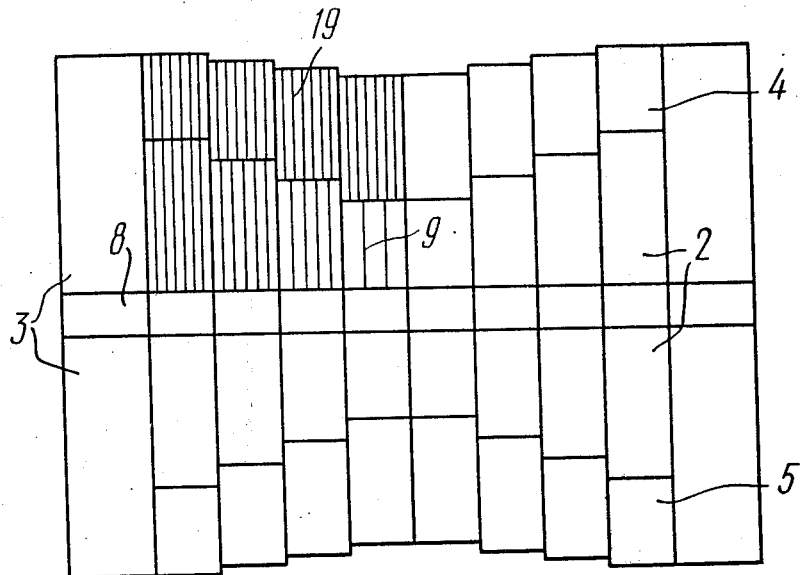
FIG. 9 shows schematically the arrangement of FIG. 8 with the main fuel elements being spaced at different intervals, according to the invention.

In still another embodiment, the main fuel elements 9 (FIG. 8) and 19 are arranged so that, in contrast to the above embodiment, the height of the fuel elements 19 of the upper axial blanket 4, forming transversely a stepped profile, gradually increases towards the vertical axis of the reactor. The variation of the intervals between the fuel elements 9 and 19 of the core 2 and the upper axial blanket, respectively, is, in this case, regular or, as is shown in FIG. 9, irregular.

Figure 10:
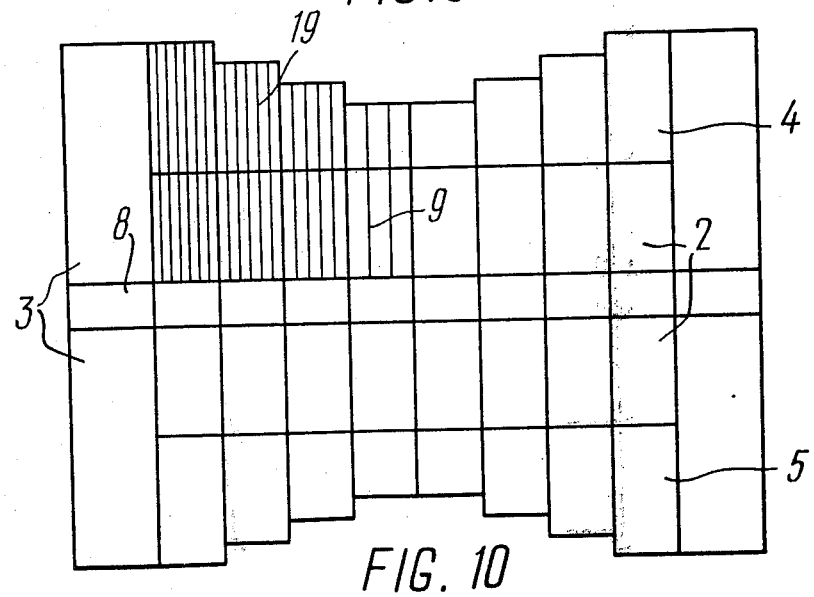
FIG. 10 shows schematically the arrangement of the main fuel elements spaced at equal intervals in the core and the upper axial blanket so as to form, transversely, a flat profile in the core and a stepped profile in the axial blanket, according to the invention.
Figure 11:
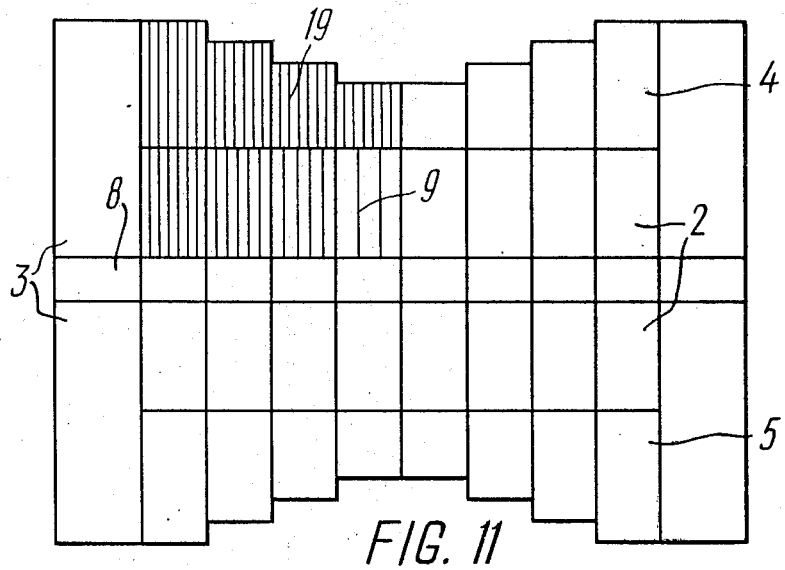
FIG. 11 shows schematically the arrangement of FIG. 10 with the main fuel elements being spaced at different intervals, according to the invention.
Figure 12:
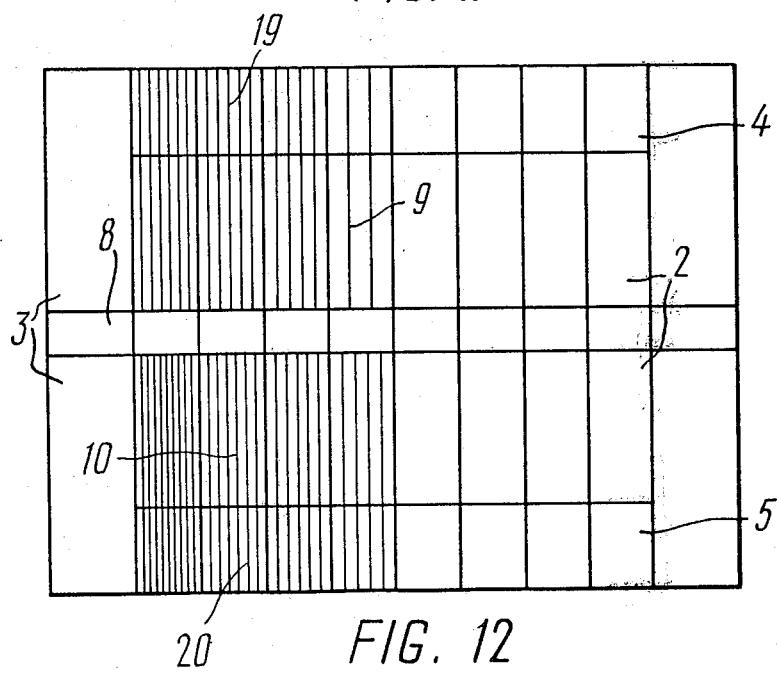
FIG. 12 shows schematically the arrangement of main and additional fuel elements spaced at different intervals in the upper and lower sections of the reactor, according to the invention.
Figure 14:
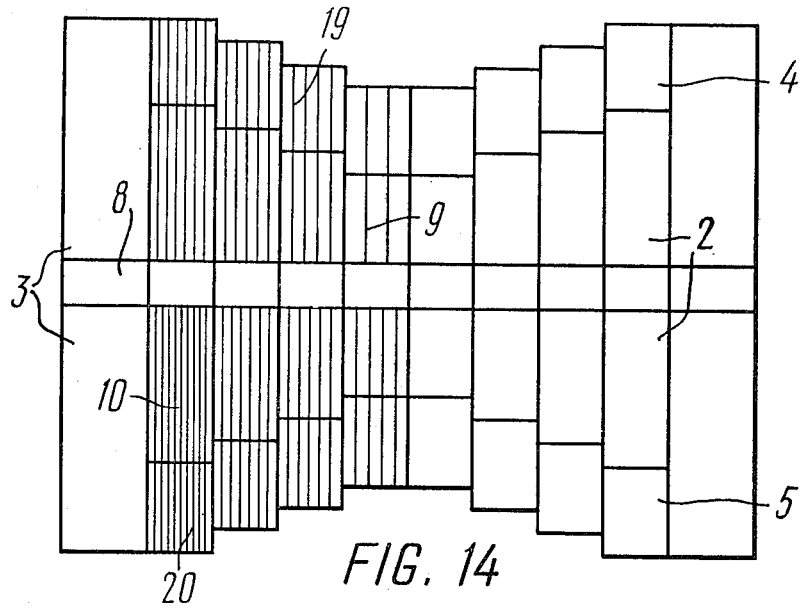
FIG. 14 shows schematically the arrangement of main and additional fuel elements spaced at different intervals in the upper and lower sections of the reactor so as to form, transfersely, a stepped profile, according to the invention.
Figure 15:
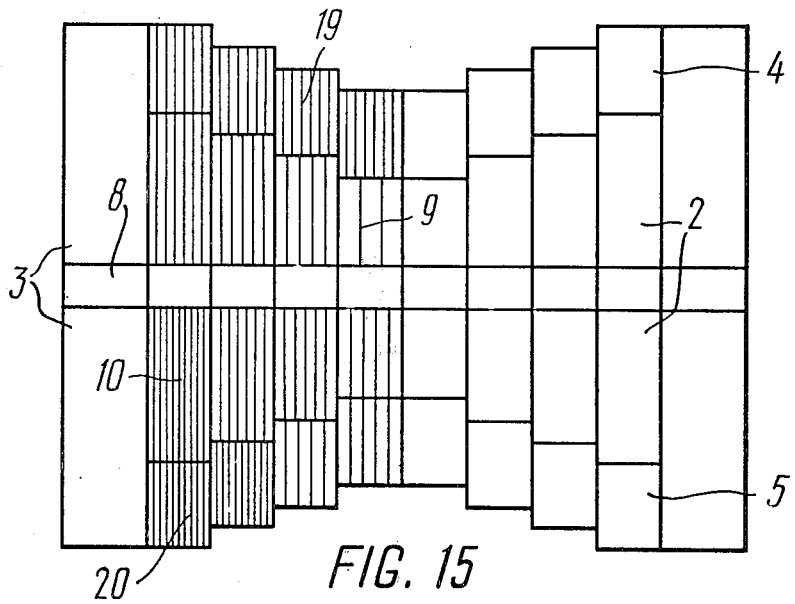
FIG. 15 shows schematically the arrangement of FIG. 14 with the main and additional fuel elements being spaced at different intervals directly in the upper and lower sections of the reactor, according to the invention.
Figure 16:
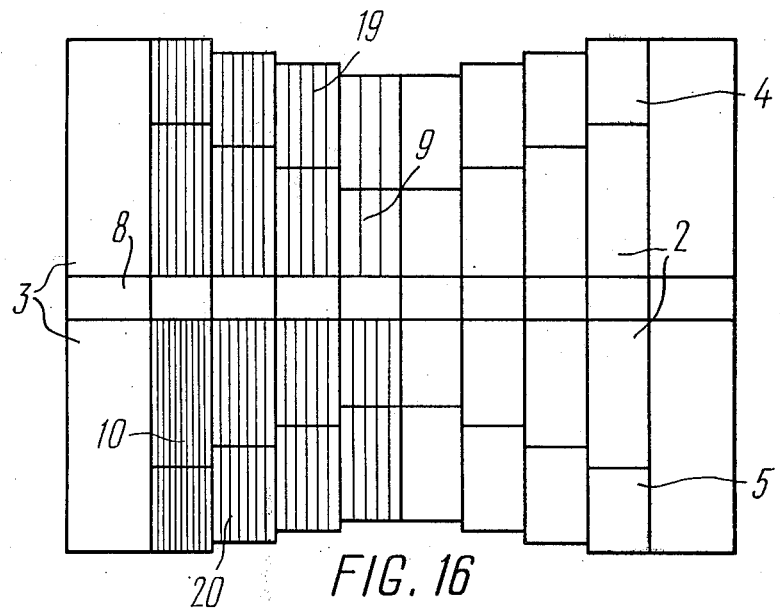
FIG. 16 shows schematically the arrangement of main and additional fuel elements spaced at equal intervals directly in the upper and lower sections of the reactor so that the height of the main and additional fuel elements in the upper and lower axial blankets, respectively, gradually increases towards the center of the reactor, according to the invention.
Figure 17:
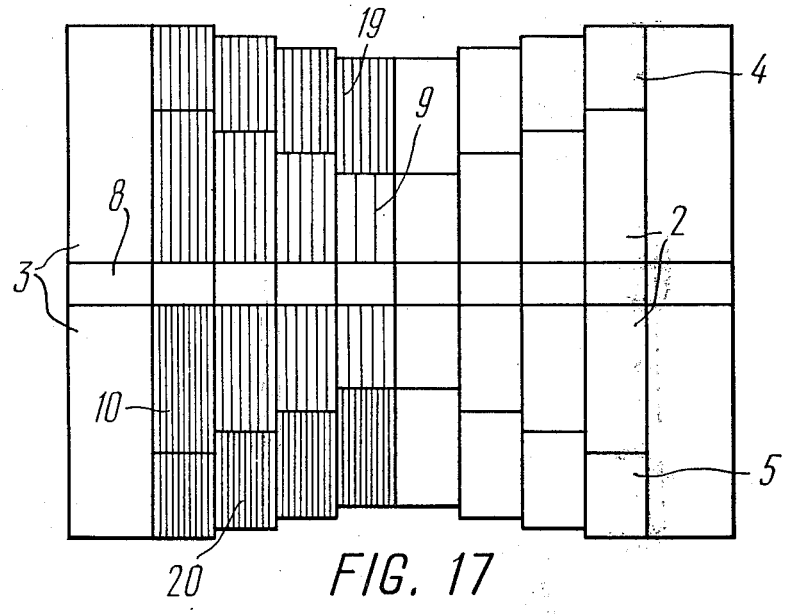
FIG. 17 shows schematically the arrangement of FIG. 16 with the fuel elements being spaced at different intervals directly in the upper and lower sections of the reactor, according to the invention.
Figure 18:
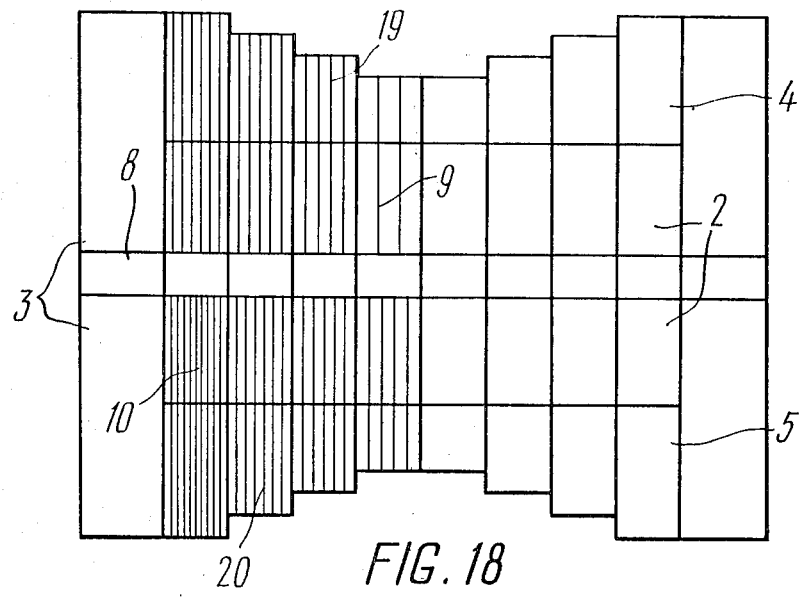
FIG. 18 shows schematically the arrangement of main and additional fuel elements spaced at different intervals in the upper and lower sections of the reactor so as to form, transversely, a flat profile in the core and a stepped profile in the axial blankets, according to the invention.
Figure 19:
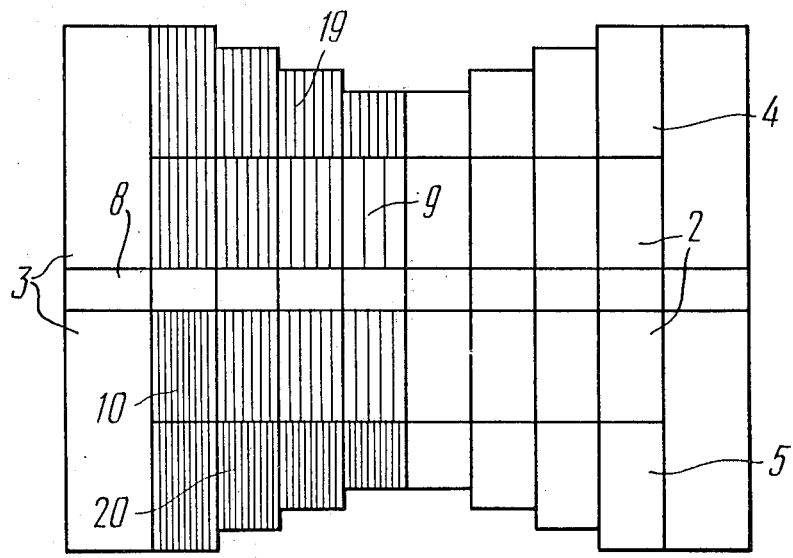
FIG. 19 shows schematically the arrangement of FIG. 18 with the main and additional fuel elements being spaced at different intervals directly in the upper and lower sections of the reactor, according to the invention.
Figure 13:
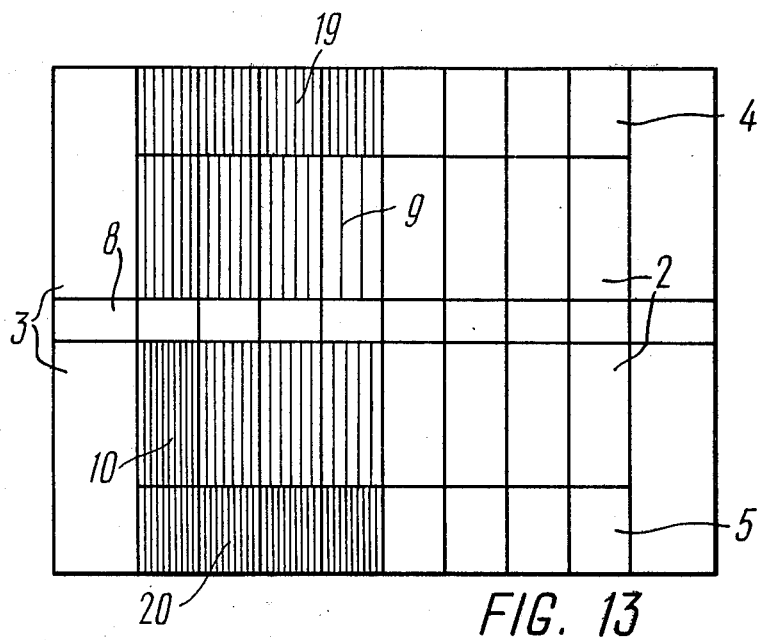
FIG. 13 shows schematically the arrangement of FIG. 12 with the main and additional fuel elements being spaced at different intervals directly in the upper and lower sections of the reactor, according to the invention.

In yet another embodiment, the main fuel elements 9 (FIG. 10) of the core 2 are arranged so as to form, transversely, a flat profile with the height of the fuel elements being equal. The fuel elements 19 of the upper axial blanket 4, on the other hand, form a stepped profile with their heights gradually diminishing towards the vertical axis of the reactor. The variation of the intervals between the fuel elements 9 and 19 of the core 2 and the upper axial blanket 4, respectively, is, as in the case with the above embodiments, regular or, as is shown in FIG. 11, irregular.

Figure 3:
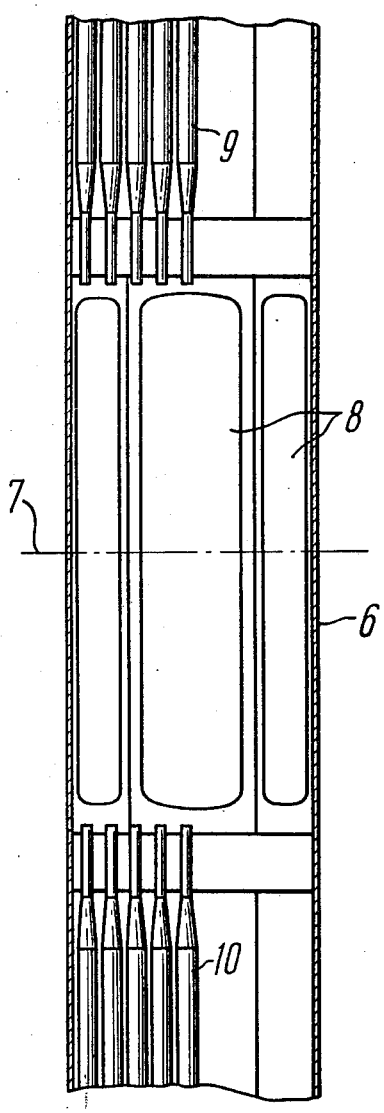
FIG. 3 is a front elevation view of a fuel element stack, according to the invention.

In all the embodiments considered so far, the additional fuel elements 10 (FIG. 3) and 20 of the core 2 (FIG. 2) and the lower axial blanket 5, respectively, are arranged in a manner like the main fuel elements 9 (FIG. 3).

It is also expedient that the main fuel elements of the core and the upper axial blanket be spaced at intervals varying, in all the above embodiments, in a manner dissimilar to that of the additional fuel elements of the core and the lower axial blanket, as is shown in FIGS. 12, 13, 14, 15, 16, 17, 18 and 19.

Besides, it is advisable that the height of the fuel elements making up the blankets be, in all the embodiments, different in the upper and lower sections of the reactor.

The proposed fast-neutron reactor operates as follows.

Liquid sodium is delivered by means of the pump 14 (FIG. 1) from the annular plenum chamber 15 to the inlet header 11 in which it is split into two oppositely directed flows washing the main and additional fuel elements 9 (FIG. 3), 19, 10 and 20 in the core 2 (FIG. 2) and the blankets 3, 4 and 5. Having absorbed the heat released by the fuel elements as a result of the reaction of fission of the substance filling the fuel elements, the liquid sodium coolant is lead away through the outlet headers 12 (FIG. 1) and 13 to the intermediate heat exchanger 16. In the latter, the liquid sodium coolant is cooled and is fed therefrom to the plenum chamber of the pump 14 through the transfer chamber 17, whereafter the coolant returns to the reactor.

In the proposed fast-neutron reactor, the removal of heat is effected so that the cold coolant is fed directly to the most critical portions of the fuel elements. This enables to increase the power capacity of the reactor bringing it up to a value approximating that of the core of a reactor in which the ratio D/H $\geq$ 3.

Figure 20:
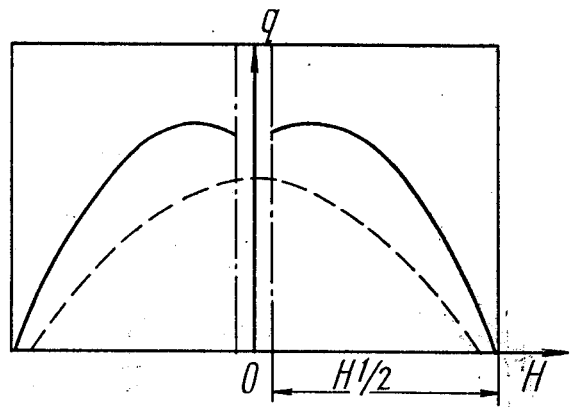
FIG. 20 is a graph showing the heat-release density versus the height of the core of the proposed fast-neutron reactor.

For a better understanding of the operating principle of the herein-disclosed reactor, its operation is further illustrated by the graphs of FIG. 20 showing the dependence of the heat-release density $q$ plotted on the ordinate axis on the height H of the reactor core, plotted on the abscissa axis. The solid line represents the heat-release profile of the proposed reactor, while the broken line represents that of the BN-600 type reactor.

The heat-release profile of the proposed reactor has been substantially improved due to the fact that the more the coolant is heated the less the heat-release density becomes. This is conducive to levelling out the temperatures over the length of the fuel elements.

To make for a uniform rate of washing of the fuel elements by the coolant, no matter how near or far they are from the center of the reactor, i.e. to ensure a reliable heat removal over the entire cross-sectional area of the reactor, the fuel elements of the core and the axial blankets are spaced at intervals gradually increasing towards the vertical axis of the reactor. For the same reason, the height of the fuel elements is made increasing towards the periphery of the reactor. Such an arrangement is conducive to increasing the radical nonuniformity of the heat-release field and its stability.

Since in the lower section of the reactor the direction of the coolant flow coincides with the direction of the force of gravity, while in the upper section these directions are opposite (i.e. the upper and lower sections of the reactor operate under different conditions), to provide for the same operating conditions for all the fuel elements 9 (FIG. 3), 19, 10 and 20, it is preferable that the height of the additional fuel elements 10 and 20 disposed in the lower section of the reactor below the plane 7 be greater and the intervals between these fuel elements be less than those of the main fuel elements 9 and 19 disposed in the upper section of the reactor.

The process of heat removal in all the embodiments of the proposed reactor with all the variants of arrangement of the fuel elements is similar to that described herein above.

Given below is a comparative table of basic characteristics of the proposed reactor and the known BN-600 type reactor.

| Characteristics | BN-type reactor | Proposed reactor |
| --- | --- | --- |
| Heat power, in MW | 2,500 | 2,500 |
| Outlet coolant temperature, in °C | 400 | 400 |
| Heating of coolant, in °C | 180 | 180 |
| Mean thermal stress, in kW/l | 400 | 560 |
| Specific fuel loading calculated per 1 MW (el.) | 2.8 | 2.2 |
| Total conversion ratio | 1.8 | 1.75 |
| Fuel doubling period (in years) with the external fuel reprocessing period being equal to 0.5 years | 5 | 4 |
| Sodium void coefficient of reactivity (with a 100% removal of Na from the central region) | +1.3 | −0.6 |

The present invention can be used to utmost advantage in reactors using low-temperature fuel. Therefore, used as the basis for designing is a cylindrical fast-neutron reactor using metallic fuel. The following limit temperature values were used in calculations: $t_1 = 650°C$ — temperature in the center of a fuel element; $t_2 = 550°C$ — temperature of a fuel-element jacket; $t_3 = 400°C$ — outlet coolant temperature; $t_4 = 180°C$ — average heating of the coolant. Under such temperature conditions, the mean power capacity of the reactor is $Q = 400$ kW/l. Removing heat in such a reactor in accordance with the present invention will result in a 1.3- to 1.5-fold increase in the power capacity.

As can be seen from the Table, one of the advantages of the reactor is its improved safety which is due to the fact that the presence of a sodium-filled space in the central portion of the reactor accounts for a better sodium void coefficient of reactivity.

An outstanding feature of the proposed reactor is a lower hydraulic resistance in the coolant duct of the reactor. This permits to additionally improve the characteristics of the reactor by increasing the flow rate of the coolant or, if necessary, the height of the core.

It is interesting to note that should the proposed reactor use a gaseous coolant, the problem of the natural circulation being affected under the reactor shut-down cooling conditions is no more important. Besides, the proposed invention provides for a lower coefficient of the heat-release density non-uniformity, as well as for stabilizing the heat-release field.

What is claimed is:

1. A fast-neutron reactor comprising a core; a lateral blanket; an upper and a lower axial blankets enveloping, together with said lateral blanket, said core of the reactor; fuel element stacks disposed in said core and in all said blankets; each of said fuel element stacks having holes disposed in its walls approximately in the middle portion thereof with respect to the height of said core; main fuel elements disposed in said stacks above the plane passing through the center of said holes; additional fuel elements disposed in said stacks below said plane opposite to said main fuel elements; a coolant washing said main and additional fuel elements; an inlet header for said coolant, said inlet being formed by the spacing between said main and additional fuel elements together with said holes and splitting said coolant into two oppositely directed flows; and two outlet headers for said coolant arranged below and above said lower and upper axial blankets, respectively.

2. A fast-neutron reactor comprising a core; a lateral blanket; an upper and a lower axial blankets enveloping, together with said lateral blanket, said core of the reactor; fuel element stacks disposed in said core and in all said blankets; each of said fuel element stacks having holes disposed in its walls approximately in the middle portion thereof with respect to the height of said core; main fuel elements disposed in said stacks below the plane passing through the centers of said holes; additional fuel elements disposed in said stacks above said plane opposite to said main fuel elements; a coolant washing said main and additional fuel elements; an inlet header for said coolant, said inlet header being formed by the spacing between said main and additional fuel elements together with said holes and splitting said coolant into two oppositely directed flows; and two outlet headers of said coolant arranged below and above said lower and upper axial blankets, respectively.

3. A fast-neutron reactor comprising a core; a lateral blanket; an upper and a lower axial blankets enveloping, together with said lateral blanket, said core of the reactor; fuel element stacks disposed in said core and in all said blankets; each of said fuel element stacks having holes disposed in its walls approximately in the middle portion thereof with respect to the height of said core; main fuel elements disposed in said stacks above the plane passing through the centers of said holes; additional fuel elements disposed in said stacks below said plane opposite to said main fuel elements; said main and additional fuel elements disposed in said stacks of said core and axial blankets being spaced at intervals gradually increasing towards the vertical axis of the reactor; a coolant washing said main and additional fuel elements; an inlet header of said coolant, said inlet header being formed by the spacing between said main and additional fuel elements together with said holes and splitting said coolant into two oppositely directed flows; and two outlet headers of said coolant arranged below and above said lower and upper axial blankets, respectively.

4. A fast-neutron reactor comprising a core; a lateral blanket; an upper and a lower axial blankets enveloping, together with said lateral blanket, said core of the reactor; fuel element stacks disposed in said core and in all said blankets; each of said fuel element stacks having holes disposed in its walls approximately in the middle portion thereof with respect to the height of said core; main fuel elements disposed in said stacks below the plane passing through the centers of said holes; additional fuel elements disposed in said stacks above said plane opposite to said main fuel elements; said main and additional fuel elements disposed in said stacks of said core and axial blankets being spaced at intervals gradually increasing towards the vertical axis of the reactor, a coolant washing said main and additional fuel elements; an inlet header of said coolant, said inlet header being formed by the spacing between said main and additional fuel elements together with said holes and splitting said coolant into two oppositely directed flows; and two outlet headers of said coolant arranged below and above said lower and upper axial blankets, respectively.

5. A reactor as of claim 1, wherein said main and additional fuel elements of said axial blankets are spaced at equal intervals.

6. A reactor as of claim 2, wherein said main and additional fuel elements of said axial blankets are spaced at equal intervals.

7. A reactor as of claim 3, wherein said main and additional fuel elements of said axial blankets are spaced at equal intervals.

8. A reactor as of claim 4, wherein said main and additional fuel elements of said axial blankets are spaced at equal intervals.

9. A reactor as of claim 1, wherein said main and additional fuel elements of said core are arranged so as to form, transversely from stack to stack, a stepped profile with the height thereof gradually diminishing towards the vertical axis of the reactor, while said main and additional fuel elements of said axial blankets are arranged so as to form, transversely, a stepped profile with the height thereof being the same over the entire width from the periphery to the vertical axis of the reactor.

10. A reactor as of claim 2, wherein said main and additional fuel elements of said core are arranged so as to form, transversely from stack to stack, a stepped profile with the height thereof gradually diminishing towards the vertical axis of the reactor, while said main and additional fuel elements of said axial blankets are arranged so as to form, transversely, a stepped profile with the height thereof being the same over the entire width from the periphery to the vertical axis of the reactor.

11. A reactor as of claim 3, wherein said main and additional fuel elements of said core are arranged so as to form, transversely from stack to stack, a stepped profile with the height thereof gradually diminishing towards the vertical axis of the reactor, while said main and additional fuel elements of said axial blankets are arranged so as to form, transversely, a stepped profile with the height thereof being the same over the entire width from the periphery to the vertical axis of the reactor.

12. A reactor as of claim 4, wherein said main and additional fuel elements of said core are arranged so as to form, transversely from stack to stack, a stepped profile with the height thereof gradually diminishing towards the vertical axis of the reactor, while said main and additional fuel elements of said axial blankets are arranged so as to form, transversely, a stepped profile with the height thereof being the same over the entire width from the periphery to the vertical axis of the reactor.

13. A reactor as of claim 5, wherein said main and additional fuel elements of said core are arranged so as to form, transversely from stack to stack, a stepped profile with the height thereof gradually diminishing towards the vertical axis of the reactor, while said main and additional fuel elements of said axial blankets are arranged so as to form, transversely, a stepped profile with the height thereof being the same over the entire width from the periphery to the vertical axis of the reactor.

14. A reactor as of claim 6, wherein said main and additional fuel elements of said core are arranged so as to form, transversely from stack to stack, a stepped profile with the height thereof gradually diminishing towards the vertical axis of the reactor, while said main and additional fuel elements of said axial blankets are arranged so as to form, transversely, a stepped profile with the height thereof being the same over the entire width from the periphery to the vertical axis of the reactor.

15. A reactor as of claim 7, wherein said main and additional fuel elements of said core are arranged so as to form, transversely from stack to stack, a stepped profile with the height thereof gradually diminishing towards the vertical axis of the reactor, while said main and additional fuel elements of said axial blankets are arranged so as to form, transversely, a stepped profile with the height thereof being the same over the entire width from the periphery to the vertical axis of the reactor.

16. A reactor as of claim 8, wherein said main and additional fuel elements of said core are arranged so as to form, transversely from stack to stack, a stepped profile with the height thereof gradually diminishing towards the vertical axis of the reactor, while said main and additional fuel elements of said axial blankets are arranged so as to form, transversely, a stepped profile with the height thereof being the same over the entire width from the periphery to the vertical axis of the reactor.

17. A reactor as of claim 9, wherein the height of the fuel elements of said axial blankets, forming, transversely, a stepped profile, gradually increases towards the vertical axis of the reactor.

18. A reactor as of claim 10, wherein the height of the fuel elements of said axial blankets, forming, transversely, a stepped profile, gradually increases towards the vertical axis of the reactor.

19. A reactor as of claim 11, wherein the height of the fuel elements of said axial blankets, forming, transversely, a stepped profile, gradually increases towards the vertical axis of the reactor.

20. A reactor as of claim 12, wherein the height of the fuel elements of said axial blankets, forming, transversely, a stepped profile, gradually increases towards the vertical axis of the reactor.

21. A reactor as of claim 13, wherein the height of the fuel elements of said axial blankets, forming, transversely, a stepped profile, gradually increases towards the vertical axis of the reactor.

22. A reactor as of claim 14, wherein the height of the fuel elements of said axial blankets, forming, transversely, a stepped profile, gradually increases towards the vertical axis of the reactor.

23. A reactor as of claim 15, wherein the height of the fuel elements of said axial blankets, forming, transversely, a stepped profile, gradually increases towards the vertical axis of the reactor.

24. A reactor as of claim 16, wherein the height of the fuel elements of said axial blankets, forming, transversely, a stepped profile, gradually increases towards the vertical axis of the reactor.

25. A reactor as of claim 1, wherein said main and additional fuel elements of said core are arranged so as to form, transversely from stack to stack, a flat profile with the height thereof being the same in all said stacks, while said main and additional fuel elements of said axial blankets are arranged so as to form, transversely, a stepped profile with the height thereof gradually diminishing towards the vertical axis of the reactor.

26. A reactor as of claim 2, wherein said main and additional fuel elements of said core are arranged so as to form, transversely from stack to stack, a flat profile with the height thereof being the same in all said stacks, while said main and additional fuel elements of said axial blankets are arranged so as to form, transversely, a stepped profile with the height thereof gradually diminishing towards the vertical axis of the reactor.

27. A reactor as of claim 3, wherein said main and additional fuel elements of said core are arranged so as to form, transversely from stack to stack, a flat profile with the height thereof being the same in all said stacks, while said main and additional fuel elements of said axial blankets are arranged so as to form, transversely, a stepped profile with the height thereof gradually diminishing towards the vertical axis of the reactor.

28. A reactor as of claim 4, wherein said main and additional fuel elements of said core are arranged so as to form, transversely from stack to stack, a flat profile with the height thereof being the same in all said stacks, while said main and additional fuel elements of said axial blankets are arranged so as to form, transversely, a stepped profile with the height thereof gradually diminishing towards the vertical axis of the reactor.

29. A reactor as of claim 5, wherein said main and additional fuel elements of said core are arranged so as to form, transversely from stack to stack, a flat profile with the height thereof being the same in all said stacks, while said main and additional fuel elements of said axial blankets are arranged so as to form, transversely, a stepped profile with the height thereof gradually diminishing towards the vertical axis of the reactor.

30. A reactor as of claim 6, wherein said main and additional fuel elements of said core are arranged so as to form, transversely from stack to stack, a flat profile with the height thereof being the same in all said stacks, while said main and additional fuel elements of said axial blankets are arranged so as to form, transversely, a stepped profile with the height thereof gradually diminishing towards the vertical axis of the reactor.

31. A reactor as of claim 7, wherein said main and additional fuel elements of said core are arranged so as to form, transversely from stack to stack, a flat profile with the height thereof being the same in all said stacks, while said main and additional fuel elements of said axial blankets are arranged so as to form, transversely, a stepped profile with the height thereof gradually diminishing towards the vertical axis of the reactor.

32. A reactor as of claim 8, wherein said main and additional fuel elements of said core are arranged so as to form, transversely from stack to stack, a flat profile with the height thereof being the same in all said stacks, while said main and additional fuel elements of said axial blankets are arranged so as to form, transversely, a stepped profile with the height thereof gradually diminishing towards the vertical axis of the reactor.

33. A reactor as of claim 1, wherein said main fuel elements of said core and axial blankets are spaced at greater intervals than said additional fuel elements of said core and axial blankets.

34. A reactor as of claim 2, wherein said main fuel elements of said core and axial blankets are spaced at greater intervals than said additional fuel elements of said core and axial blankets.

35. A reactor as of claim 3, wherein said main fuel elements of said core and axial blankets are spaced at greater intervals than said additional fuel elements of said core and axial blankets.

36. A reactor as of claim 4, wherein said main fuel elements of said core and axial blankets are spaced at greater intervals than said additional fuel elements of said core and axial blankets.

* * * * *